(12) United States Patent
Cross et al.

(10) Patent No.: US 11,597,142 B2
(45) Date of Patent: Mar. 7, 2023

(54) ANNEALED ELASTOMERIC THERMOPLASTIC POWDERS FOR ADDITIVE MANUFACTURING, METHODS THEREOF, AND ARTICLES INCLUDING THE POWDERS

(71) Applicant: NIKE, Inc., Beaverton, OR (US)

(72) Inventors: John Cross, Portland, OR (US); Luis Folgar, Beaverton, OR (US); Ryan R. Larson, Portland, OR (US)

(73) Assignee: NIKE, INC., Beaverton, OR (US)

( * ) Notice: Subject to any disclaimer, the term of this patent is extended or adjusted under 35 U.S.C. 154(b) by 299 days.

(21) Appl. No.: 16/970,236

(22) PCT Filed: Jan. 14, 2019

(86) PCT No.: PCT/US2019/013492
§ 371 (c)(1),
(2) Date: Aug. 14, 2020

(87) PCT Pub. No.: WO2019/160632
PCT Pub. Date: Aug. 22, 2019

(65) Prior Publication Data
US 2020/0406537 A1    Dec. 31, 2020

Related U.S. Application Data

(60) Provisional application No. 62/631,550, filed on Feb. 16, 2018.

(51) Int. Cl.
*B29C 64/153* (2017.01)
*B33Y 10/00* (2015.01)
(Continued)

(52) U.S. Cl.
CPC .......... *B29C 64/153* (2017.08); *B29B 13/021* (2013.01); *B29C 64/314* (2017.08);
(Continued)

(58) Field of Classification Search
CPC . B29C 65/4875; B29C 65/486; B29C 43/006; B29C 2043/105; B29C 2071/022;
(Continued)

(56) References Cited

U.S. PATENT DOCUMENTS 5,356,945 A * 10/1994 Werner .............. C08G 18/8064
528/45
2016/0181601 A1   6/2016 Usui
2016/0215092 A1*  7/2016 Vanelli ................. C08G 69/14

FOREIGN PATENT DOCUMENTS

AU      1260197 A    4/1997
EP      2564714 A1   6/2013
(Continued)

OTHER PUBLICATIONS

International Search Report and Written Opinion for PCT/US2019/013492 dated May 14, 2019.

*Primary Examiner* — Stella K Yi
(74) *Attorney, Agent, or Firm* — Thomas | Horstemeyer, LLP

(57) ABSTRACT

The present disclosure provides for making annealed additive manufacturing powder, where the powder can be used to make structures using additive manufacturing processes. The additive manufacturing powder can be annealed to improve the flowability of the powder. Once annealed, the powder can be used in the additive manufacturing process and structures can be formed by affixing the powder particles to one another (e.g., by reflowing and re-solidifying a material present in the powder particles). The annealed additive manufacturing powder can be formed in a layer-by-layer additive process to produce articles such as a component of an article of sporting equipment, apparel or footwear (10), including a sole structure (30) for footwear (10).

20 Claims, 5 Drawing Sheets

(51) Int. Cl.
*B33Y 70/00* (2020.01)
*B33Y 80/00* (2015.01)
*B29C 64/314* (2017.01)
*B29B 13/02* (2006.01)
*C08J 5/00* (2006.01)
*A43B 13/04* (2006.01)
*B29K 21/00* (2006.01)
*B29K 75/00* (2006.01)
*B29L 31/50* (2006.01)

(52) U.S. Cl.
CPC ............... *B33Y 10/00* (2014.12); *B33Y 70/00* (2014.12); *B33Y 80/00* (2014.12); *C08J 5/00* (2013.01); *A43B 13/04* (2013.01); *B29K 2021/003* (2013.01); *B29K 2075/00* (2013.01); *B29L 2031/504* (2013.01); *C08J 2375/04* (2013.01)

(58) Field of Classification Search
CPC .. B29C 66/0344; B29C 64/314; B29C 64/153
See application file for complete search history.

(56) References Cited

FOREIGN PATENT DOCUMENTS

| | | |
|---|---|---|
| JP | 2017039253 A | 2/2017 |
| KR | 101628580 B1 | 9/2016 |
| WO | 2017160870 A1 | 9/2017 |

* cited by examiner

ANNEALED ELASTOMERIC THERMOPLASTIC POWDERS FOR ADDITIVE MANUFACTURING, METHODS THEREOF, AND ARTICLES INCLUDING THE POWDERS

CLAIM OF PRIORITY TO RELATED APPLICATION

This application is the 35 U.S.C. 0.371 national stage application of PCT Application No. PCT/US2019/013492, filed Jan. 14, 2019, where the PCT claims priority to and the benefit of U.S. provisional application entitled "ANNEALED ELASTOMERIC THERMOPLASTIC POWDERS FOR ADDITIVE MANUFACTURING, METHODS THEREOF, AND ARTICLES INCLUDING THE POWDERS" having Ser. No. 62/631,550 filed on Feb. 16, 2018, both of which are herein incorporated by reference in their entireties.

BACKGROUND

The design and manufacture of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear. With the increased use of additive manufacturing methods, new additive manufacturing materials suitable for use in athletic equipment, apparel and footwear are being developed and utilized.

DESCRIPTION

Figure 1:
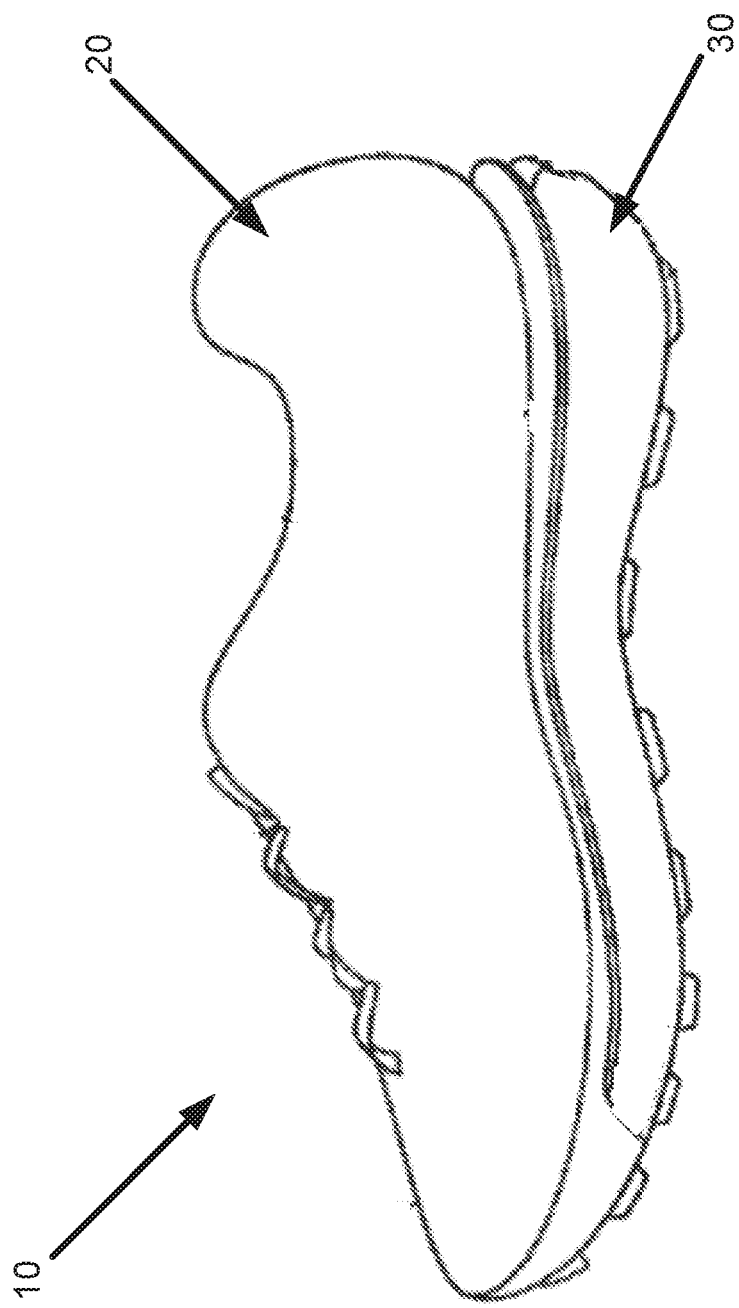
FIG. 1 is a side view of an example of footwear.

The present disclosure provides for making annealed additive manufacturing powder, where the powder can be used to make structures using additive manufacturing processes. The additive manufacturing powder can be annealed to improve the flowability of the powder. Once annealed, the powder can be used in the additive manufacturing process and structures can be formed by affixing the powder particles to one another (e.g., by reflowing and re-solidifying a material present in the powder particles). The annealed additive manufacturing powder can be formed in a layer-by-layer additive process to produce articles such as a component of an article of sporting equipment, apparel or footwear, including a sole structure for footwear. The articles produced using the additive manufacturing powder can have elastomeric properties. The additive manufacturing powder can comprise thermoplastic such as thermoplastic elastomers (TPE) as well as other components binding materials, colorants, flow agents, and the like.

The annealing process includes increasing the temperature of the additive manufacturing powder to a temperature above the glass transition temperature of the additive manufacturing powder but below a melting temperature of the additive manufacturing powder for a first period of time and then cooling the powder to form the annealed additive manufacturing powder. The annealed additive manufacturing powder has improved flowability relative to unannealed additive manufacturing powder, which is advantageous in additive manufacturing processes.

The present disclosure provides for a method of forming an annealed additive manufacturing powder, comprises: annealing an additive manufacturing powder, wherein annealing includes: increasing a temperature of the additive manufacturing powder, wherein the additive manufacturing power comprises a polymer such as a thermoplastic elastomer (TPE), wherein the temperature is increased to a temperature above the glass transition temperature of the additive manufacturing powder but below a melting temperature of the additive manufacturing powder for a first period of time; and decreasing the temperature of the powder by at least 10 degrees Celsius after the first period of time to form the annealed additive manufacturing powder. The annealed additive manufacturing powder comprises a plurality of annealed additive manufacturing powder particles.

The present disclosure provides for a structure that comprises an article which is the product of an additive manufacturing process including melting and re-solidifying a plurality of layers, each layer including plurality of annealed additive manufacturing powder particles as described herein.

The present disclosure provides for a method of making an article, comprising: applying, during an additive manufacturing process, a first layer of an annealed additive manufacturing powder in a build compartment of an additive manufacturing device, wherein the annealed additive manufacturing powder comprises a plurality of annealed additive manufacturing powder particles as described above and herein, wherein the annealed additive manufacturing powder comprises the polymer such as a TPE; affixing a portion of the plurality of the annealed additive manufacturing powder particles to each other in the first layer; and forming an additive manufactured article. Affixing can comprise melting and then re-solidifying the plurality of the annealed additive manufacturing powder particles. Affixing can include: re-flowing a portion of the annealed additive manufacturing powder particles in the first layer to form re-flowed annealed additive manufacturing powder particles; and re-solidifying the re-flowed annealed additive manufacturing powder particles, thereby affixing the annealed additive manufacturing powder particles to one another. The method can also include: applying a second layer of annealed additive manufacturing powder in a build compartment on the first layer, wherein the annealed additive manufacturing powder comprises the annealed additive manufacturing powder as described herein; and affixing a portion of the annealed additive manufacturing powder particles to each other in the second layer.

The present disclosure provides for a structure, comprising an article formed by the process as described above. The article is an article of footwear, a component of footwear, an article of apparel, a component of apparel, an article of sporting equipment, or a component of sporting equipment.

This disclosure is not limited to particular aspects described, and as such may, of course, vary. The terminology used herein serves the purpose of describing particular aspects only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure. Any recited method may be carried out in the order of events recited or in any other order that is logically possible.

The present disclosure can employ, unless otherwise indicated, techniques of material science, chemistry, textiles, polymer chemistry, and the like, which are within the skill of the art. Such techniques are explained fully in the literature.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Now having described the present disclosure in general, additional details are provided. The present disclosure includes annealed additive manufacturing powder and structures made therefrom using additive manufacturing processes. The structures can be included in an article such as a textile. The additive manufacturing powder can be annealed to improve the flowability of the powder. Once annealed, the powder can be used in the additive manufacturing process, structures can be formed by affixing (e.g., reflowing then re-solidifying) the powder particles to one another.

As used throughout this disclosure, the terms "additive manufacturing device," "three-dimensional printing system," "three-dimensional printer," refer to any known additive manufacturing device system or printer. In addition to printing a structure based entirely on material from the additive manufacturing device, the additive manufacturing device can also accomplish printing directly onto any surface of a textile, a natural fabric, a synthetic fabric, a knit, a woven material, a nonwoven material, a mesh, a leather, a synthetic leather, a polymer, a rubber, and a foam, or any combination of them, and without the need for a perfectly or near-perfectly flat substrate surface on which to print.

The annealed additive manufacturing powder can be used to produce articles such as textiles. For example, the textile can include footwear or components thereof, apparel (e.g., shirts, jerseys, pants, shorts, gloves, glasses, socks, hats, caps, jackets, undergarments) or components thereof, bladder (e.g., gas bladder for footwear and the like), containers (e.g., backpacks, bags), and upholstery for furniture (e.g., chairs, couches, car seats), bed coverings (e.g., sheets, blankets), table coverings, towels, flags, tents, sails, and parachutes. In addition, the annealed additive manufacturing powder can be used to produce articles or other items that are disposed on the article, where the article can be striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

The additive manufacturing process can use the annealed additive manufacturing powder to form one or more components in an article of footwear. FIG. 1 illustrates an article of footwear 10 that includes an upper 20 and a sole structure 30, where the upper 20 is secured to the sole structure 30. The sole structure 30 or a portion thereof can be printed directly onto upper 20 or can be printed and then attached to the upper 20. A portion of or the entire sole structure 30 can be formed using the annealed additive manufacturing powder, where the sole structure 30 can attenuate ground reaction forces (i.e., provides cushioning) when compressed between the foot and the ground during walking, running, or other ambulatory activities and/or can include wear-resistant material or structure to impart traction and/or provide durability. Also but not depicted, the sole element 30 may incorporate fluid filled chambers, plates, moderators, or other elements that further attenuate forces, enhance stability, or influence the motions of the foot.

Now having described the present disclosure in general, details regarding the annealing process will be described. The annealed additive manufacturing powder can be formed by annealing an unannealed additive manufacturing powder.

Although not intending to be bound by theory, annealing is a heat treatment process that can alter the physical and/or chemical properties (e.g., crystal structure) of the additive manufacturing powder that can improve characteristics of the additive manufacturing powder, for example the flowability of the additive manufacturing powder. The unannealed additive manufacturing powder can have a glass transition temperature and at least a primary melting temperature (also referred to as "melting point") and a secondary melting temperature as determined by differential scanning calorimetry (DSC), where the primary melting temperature is at a higher temperature than the secondary melting temperature. The annealed additive manufacturing powder can comprise a plurality of annealed additive manufacturing powder particles.

In the method, the additive manufacturing powder can be heated to a first temperature for a first period of time (e.g., about 5 minutes or more, about 30 minutes or more, about 60 minutes or more, or about 2 hours or more). The temperature can be increased to a temperature above the glass transition temperature of the additive manufacturing powder but below a melting temperature of the additive manufacturing powder (e.g., the primary melting temperature). The increase in temperature above the glass transition temperature of the additive manufacturing powder can be about 5 degrees Celsius or more, about 15 degrees Celsius or more, about 25 degrees Celsius or more, about 35 degrees Celsius or more, or about 45 degrees Celsius or more, as long as it is below a melting temperature of the additive manufacturing powder (e.g., the primary melting temperature). The temperature of the additive manufacturing powder can be increased to at least 60 degrees Celsius or to at least 100 degrees Celsius. After the first period of time, the temperature of the additive manufacturing powder can be reduced to form the annealed additive manufacturing powder. The reduction in temperature can be about 10 degrees Celsius or more, about 20 degrees Celsius or more, about 30 degrees Celsius or more.

The glass transition temperature of the unannealed additive manufacturing powder can be below 0 degrees Celsius, the primary melting temperature of the unannealed additive manufacturing powder can be above 120 degrees Celsius, the unannealed additive manufacturing powder can have a secondary melting temperature between the glass transition temperature and the primary melting temperature, and the secondary melting temperature of the unannealed additive manufacturing powder can be about 30 degrees Celsius to about 100 degrees Celsius. The unannealed additive manufacturing powder can be annealed according the present disclosure. The annealed additive manufacturing powder can have a glass transition temperature that is below 0 degrees Celsius and is within +/−5 degrees Celsius of the glass transition temperature of the unannealed additive manufacturing powder; and can have a primary melting temperature that is above 120 degrees Celsius and is within +/−5 degrees Celsius of the primary melting temperature of the unannealed additive manufacturing powder; as well as one of the following: a secondary melting temperature that is at least 30° higher than the secondary melting temperature of the unannealed additive manufacturing powder, a secondary melting temperature that is about 80 degrees Celsius to about 120 degrees Celsius, and a secondary melting temperature that is no longer detectable by differential scanning calorimetry (DSC).

The unannealed additive manufacturing powder can have a first powder bulk density and the annealed additive manufacturing powder can have a second powder bulk density, where the second powder bulk density is less than the first powder bulk density. The powder bulk density is defined by the mass of a plurality of particles divided by the volume occupied by the plurality of particles.

The unannealed additive manufacturing powder can have a first particle bulk density and the annealed additive manufacturing powder has a second particle bulk density, where the first particle bulk density is less than the second particle bulk density. The particle bulk density is defined by the mass of a plurality of particles divided by the volume occupied by the plurality of particles after the mechanical tapping of the container results in no volume change.

The unannealed additive manufacturing powder can have a first Hausner ratio as determined according to the ASTM D7481 standard (2009) and the annealed additive manufacturing powder can have a second Hausner ratio as determined according to the ASTM D7481 standard (2009), where the second Hausner ratio is 5 percent lower than the first Hausner ratio.

The unannealed additive manufacturing powder can have a first avalanche angle as determined by the Revolution Powder Analyzer (RPA) according to the ASTM D7481 standard (2009) and the annealed additive manufacturing powder can have a second avalanche angle as determined by the Revolution Powder Analyzer (RPA) according to the ASTM D7481 standard (2009), where the second avalanche angle is 5 percent lower than the first avalanche angle.

The additive manufacturing power comprises one or more polymer such as thermoplastic elastomer (TPEs) as well as optionally other components such as binder materials, fillers, flow agents, colorants, and the like. In addition, the polymer component (TPE component) of the powder (i.e., a component consisting of all the TPEs present in the powder) is the majority component of the additive manufacturing powder. Some or all of the properties exhibited by the additive manufacturing powder are properties of the one or more polymers (TPEs) present in the additive manufacturing powder.

In such examples, the glass transition temperature of the powder is the glass transition temperature of a single form of TPE present in the composition of the powder, or is the glass transition temperature of a mixture of different forms of TPE comprising a TPE component of the composition of the powder. Similarly, in such examples, the primary melting temperature of the powder is the primary melting temperature of a TPE or a TPE component of the powder.

The secondary melting temperature of the powder can be the secondary melting temperature of a TPE or a TPE component of the powder. Alternatively, the secondary melting temperature of the powder can be a melting temperature of a material present in the composition of the powder particles or a material mixed in with the powder particles. The material present in the composition of the powder particles or mixed in with the powder particles can be a material which is not a TPE. For example, the secondary melting temperature of the powder can be a melting temperature of a flow agent. The secondary melting temperature of the powder can be a melting temperature of a material which is present in the composition of the powder particles, which coats the powder particles, or which forms separate particles than the particles comprising the TPE. For example, the secondary melting temperature of the powder can be a melting temperature of a wax or a non-elastomeric thermoplastic present in the powder.

Now having described the method of annealing the additive manufacturing powder, reference will be made to materials comprising the additive manufacturing powder. As stated above, the additive manufacturing powder can include a polymer such as thermoplastic polymers. The polymer can be an elastomeric polymer, including an thermoplastic polymer elastomer (TPE). The polymer can be selected from: polyurethanes (including elastomeric polyurethanes, thermoplastic polyurethanes (TPUs), and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof.

The term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

As previously described, the polymer can be a thermoplastic polymer. In general, a thermoplastic polymer softens or melts when heated and returns to a solid state when cooled. The thermoplastic polymer transitions from a solid state to a softened state when its temperature is increased to a temperature at or above its softening temperature, and a liquid state when its temperature is increased to a temperature at or above its melting temperature. When sufficiently cooled, the thermoplastic polymer transitions from the softened or liquid state to the solid state. As such, the thermoplastic polymer may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic polymer can have a melting temperature from about 90 degrees C. to about 190 degrees C. when determined in accordance with ASTM D3418-97 as described herein below, and includes all subranges therein in increments of 1 degree. The thermoplastic polymer can have a melting temperature from about 93 degrees C. to about 99 degrees C. when determined in accordance with ASTM D3418-97 as described herein below. The thermoplastic polymer can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic polymer can have a glass transition temperature from about −20 degrees C. to about 30 degrees C. when determined in accordance with ASTM D3418-97 as described herein below. The thermoplastic polymer can have a glass transition temperature (from about −13 degree C. to about −7 degrees C. when determined in accordance with ASTM D3418-97 as described herein below. The thermoplastic polymer can have a glass transition temperature from about 17 degrees C. to about 23 degrees C. when determined in accordance with ASTM D3418-97 as described herein below.

The thermoplastic polymer can have a melt flow index from about 10 to about 30 cubic centimeters per 10 minutes ($cm^3$/10 min) when tested in accordance with ASTM D1238-13 as described herein below at 160 degrees C. using a weight of 2.16 kilograms (kg). The thermoplastic polymer can have a melt flow index from about 22 $cm^3$/10 min to about 28 $cm^3$/10 min when tested in accordance with ASTM D1238-13 as described herein below at 160 degrees C. using a weight of 2.16 kg.

The thermoplastic polymer can have a cold Ross flex test result of about 120,000 to about 180,000 cycles without cracking or whitening when tested on a thermoformed plaque of the thermoplastic polymer in accordance with the cold Ross flex test as described herein below. The thermoplastic polymer can have a cold Ross flex test result of about 140,000 to about 160,000 cycles without cracking or whitening when tested on a thermoformed plaque of the thermoplastic polymer in accordance with the cold Ross flex test as described herein below.

The thermoplastic polymer can have a modulus from about 5 megaPascals (MPa) to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic polymer can have a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

Polyurethane

The polymer can be a polyurethane, such as a thermoplastic polyurethane (also referred to as "TPU"). Additionally, polyurethane can be an elastomeric polyurethane (TPE), including an elastomeric TPU. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

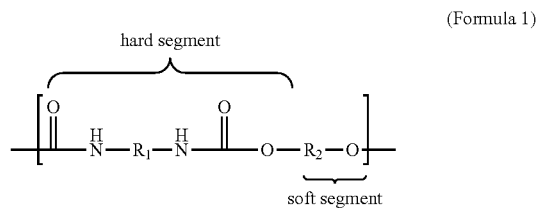

(Formula 1)

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_3$, each $R_3$ independently is an aliphatic or aromatic functional group.

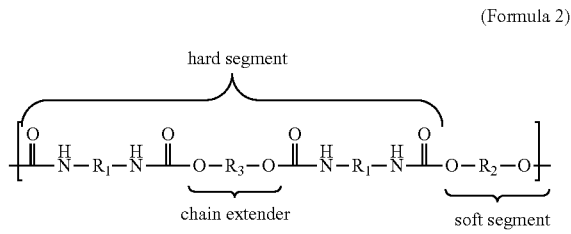

(Formula 2)

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers which form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term $C_n$, it means the alkene or alkylene group has "n" carbon atoms. For example, $C_{1-6}$ alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90 percent of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80 percent of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol, 1,5-diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol 1,5-diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkenylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkenylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly(carboxybetaine (pCB) and ammonium phosphonate groups such as a phosphatidylcholine group).

The R$_2$ group can include charged groups that are capable of binding to a counterion to ionically crosslink the polymer and form ionomers. For example, R$_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

(Formula 3)

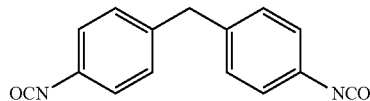

The pendant hydrophilic group can be a polyethylene oxide group and the linking group can be MDI, as shown below.

(Formula 4)

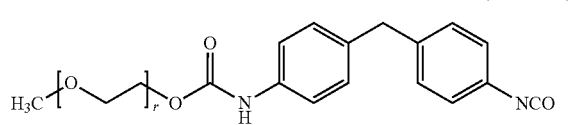

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

(Formula 5)

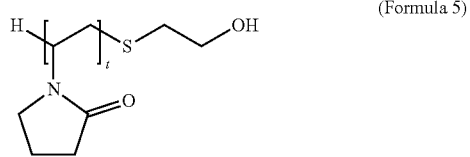

At least one R$_2$ group in the polyurethane can include a polytetramethylene oxide group. At least one R$_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference. For example, the R$_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

(Formula 6)

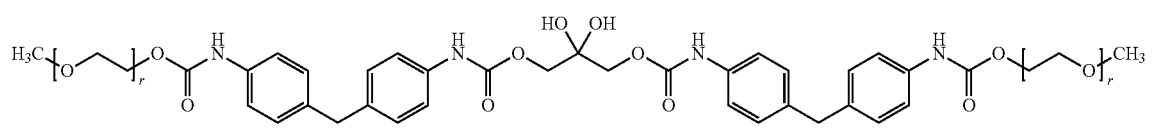

(Formula 7)

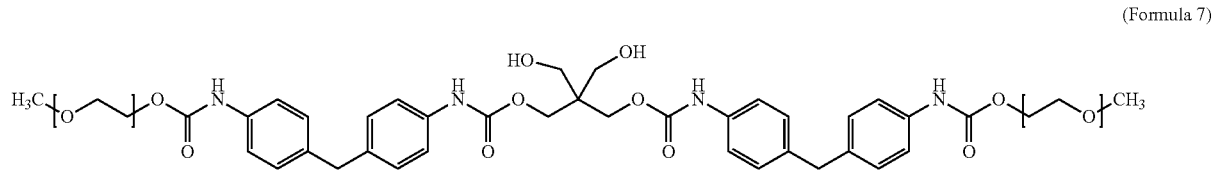

(Formula 8)

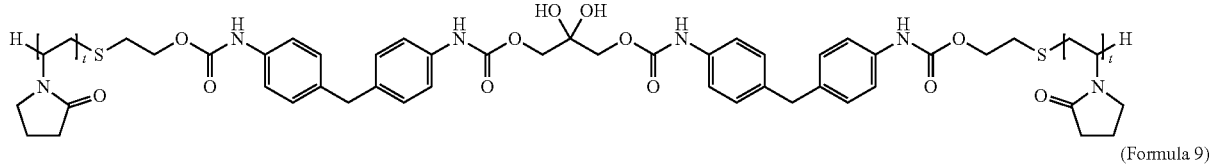

(Formula 9)

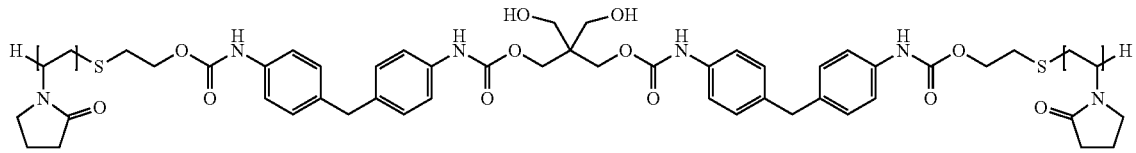

At least one $R_2$ of the polyurethane can be a polysiloxane, In these cases, the $R_2$ group can be derived from a silicone monomer of Formula 10, such as a silicone monomer disclosed in U.S. Pat. No. 5,969,076, which is hereby incorporated by reference:

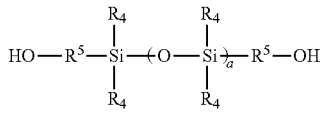

(Formula 10)

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, isopropyl, n-butyl, isobutyl, s-butyl, t-butyl, ethenyl, propenyl, phenyl, and polyethylene groups.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

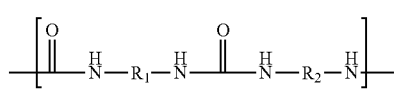

(Formula 11)

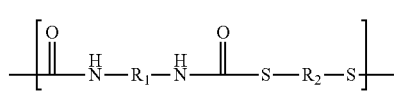

(Formula 12)

where the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

The polyurethane can be a thermoplastic polyurethane composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the "SANCURE" series of polymer such as "SANCURE" 20025F) or "TECOPHILIC" (e.g., TG-500, TG-2000, SP-80A-150, SP-93A-100, SP-60D-60) (Lubrizol, Countryside, Ill., USA), "PELLETHANE" 2355-85ATP and 2355-95AE (Dow Chemical Company of Midland, Mich., USA.), "ESTANE" (e.g., ALR G 500, or 58213; Lubrizol, Countryside, Ill., USA).

Polyamides

The polymer can comprise a polyamide, such as a thermoplastic polyamide. The polyamide can be an elastomeric polyamide, including an elastomeric thermoplastic polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein $R_6$ group represents the portion of the polyamide derived from the lactam or amino acid.

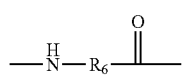

(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or laurolactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

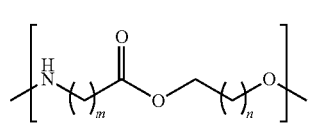

(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

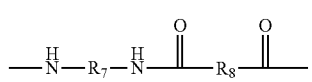

(Formula 15)

The $R_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the $R_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The $R_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

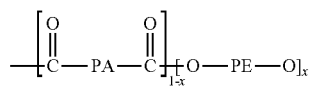
(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more a, w-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, ω-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one a, w-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be acyclic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide)s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly(ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies.

Polyesters

The polymers can comprise a polyester. The polyester can comprise a thermoplastic polyester. Additionally, the polyester can be an elastomeric polyester, including a thermoplastic polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly (3-hydroxbutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly(α-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The polymers can comprise or consist essentially of a polyolefin. The polyolefin can be a thermoplastic polyolefin. Additionally, the polyolefin can be an elastomeric polyolefin, including a thermoplastic elastomeric polyolefin. Exemplary polyolefins can include polyethylene, polypropylene, and olefin elastomers (e.g., metallocene-catalyzed block copolymers of ethylene and α-olefins having 4 to about 8 carbon atoms). The polyolefin can be a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The thermoplastic material can further comprise one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

As stated above, the additive manufacturing powder can include a flow agent. The flow agent can improve the flowability the powder and may reduce the friction, the lateral drag, and the buildup of the powder. The flow agent can be an inorganic powdered substance. The flow agent can include one or a combination of: a hydrated silica, amorphous alumina, glassy silicas, glassy phosphates, glassy borates, titanium dioxides, talc, mica, fumed silicas, kaolin, attapulgite, calcium silicates, magnesium silicates or silica. The flow agent can include: tricalcium phosphate, powdered cellulose, magnesium stearate, sodium bicarbonate, sodium ferrocyanide, potassium ferrocyanide, calcium ferrocyanide, bone phosphate, sodium silicate, silicon dioxide, calcium silicate, magnesium trisilicate, talcum powder, sodium aluminosilicate, potassium aluminium silicate, calcium aluminosilicate, bentonite, aluminium silicate, stearic acid, or polydimethylsiloxane. In an example, the flow agent can be 0.01 weight percent to less than 5 weight percent based upon the total weight percent of the powder. The flow agent can have a particle size of about 10-100 nanometer.

Also, the additive manufacturing powder can optionally include a binding material. In addition to or in the alternative, the binding material can be added to the unannealed additive manufacturing powder prior to annealing. The binding material comprises one or more monomers, one or more polymers, or combinations thereof. Also, the one or more monomers can comprise one or more epoxy group, one or more acrylic acid group, one or more methacrylic acid, one or more methyl methacrylic acid group, or combinations thereof. In addition, the one or more polymers can comprise a photocurable elastomeric resin, a heat activated resin, and combinations thereof. The one or more polymers can comprise a polyacrylate; a polyepoxide; a copolymer derived from one or more monomers comprising one or more epoxy group, one or more acrylic acid group, one or more methacrylic acid, one or more methyl methacrylic acid group; or combinations thereof. Useful copolymers are block copolymers comprising at least one polyacrylate block, polymethacrylate block, polymethylmethacrylate block, or combinations thereof. The binding material further can comprise an ultraviolet (UV) light-activated free radical polymerization initiator, a thermal energy-activated polymerization initiator, or combinations thereof.

The binding material can comprise a thermal energy absorber that can be used to reflow the annealed additive manufacturing powder. The binding material comprising a thermal energy absorber can be a liquid or a flowable gel. The thermal energy absorber is present in the binding material as a dispersion. Alternatively, the thermal energy absorber is present in the binding material as an emulsion. The binding material can comprise a thermal energy absorber is provided through a printing head, such as an ink-jet print head. Thus, the binding material comprising the thermal energy absorber has a viscosity that allows for dispersion through a print head. The thermal energy absorber can be present in the binding material is provided via spraying using a spray head have one or more orifices of suitable diameter. In such instances, the binding material comprising the thermal energy absorber has a viscosity that allows for application via a spray head. The thermal energy absorber comprises graphite, carbon fibers, carbon nanotubes, carbon black, or combinations thereof. The carbon black is in the form of a nanoparticle.

In addition, the thermal energy absorber is a microwave energy absorber. The microwave energy absorber can comprise a metal, a metal salt, metal oxide, a metal nitride, a metal carbide, a metal sulfide, a hydrated salt, a carbon, a clay, a silicate, a ceramic, a zeolite, a silica, an alumina, a titania gel, a vermiculate, a attapulgite, a molecular sieve, or combinations thereof. The microwave energy absorber present can be a metal salt can be $CuX_n$ where n is an integer from 1 to 6 and X is a halogen; $ZnX_2$ or $SnX_2$ where X is a halogen, or combinations thereof. The microwave energy absorber present can be a hydrated salt can be $NiCl_2.6H_2O$, $Al_2(SO_4)_3.18H_2O$, or combinations thereof. The microwave energy absorber present can be a metal oxide can be present as $CuO$, $NiO$, $Fe_3O_4$, $Co_2O_3$, $BaTiO_3$, or combinations thereof. Also, a microwave energy absorber can be present as a metal sulfide can be $Ag_2S$, $CuS$, $MoS_3$, $PbS$, $ZnS$, $FeS$, $FeS_2$, or combinations thereof. The microwave energy absorber can be present as a metal carbide can be $SiC$, $W_2C$, $B_4C$, or combinations thereof. A variety of different metal nitrides are suitable for use as a microwave energy absorber, including, but not limited to TiN. The microwave energy absorber can be present as carbon in the form of graphite, carbon fibers, carbon nanotubes, carbon black, or combinations thereof. A carbon black can be any suitable form for use as a microwave energy absorber such a nanoparticle or a microparticle. A variety of different clays are suitable for use as a microwave energy absorber, including, but not limited to a sepiolite clay. The microwave energy absorber can further comprise water. The microwave energy absorber can have an average particle size of from about 0.1 nm to about 50 μm. The microwave energy absorber can be present in the binding material at from about 0.1 weight percent to about 25 weight percent based on the total weight of the binding material.

The thermal energy absorber can be an infrared energy absorber. There a variety of suitable infrared energy absorbers that can be used in the disclosed binding material. The infrared energy absorber can comprise a metal oxide, a metal complex compound, an infrared absorbing dye, or combinations thereof. The infrared energy absorber can be present as a metal oxide can be tin oxide, zinc oxide, copper oxide; antimony-doped tin oxide, indium-doped tin oxide, or combinations thereof. The infrared energy absorber can be present as a metal complex can be a zinc oxide comprising at least one element selected from the group consisting of In, Ga, Al, and Sb, or combinations thereof. The infrared energy absorber can be present as an infrared absorbing dye can be an anthraquinone dye, cyanine dye, polymethine dye, azomethine dye, azo dye, polyazo dye, diimonium dye, aminium dye, phthalocyanine dye, naphthalocyanine dye, indocyanine dye, naphthoquinone dye, indole phenol dye, triallylmethane dye, metal complex dye, dithiol nickel complex dye, azo cobalt complex dye, a squarylium dye, or combinations thereof. The infrared energy absorber can be present in the binding material at from about 0.001 weight percent to about 0.08 weight percent based on the total weight of the binding material. The infrared energy absorber can be present in the binding material at from about 0.005 weight percent to about 0.06 weight percent based on the total weight of the binding material.

The binding material can comprise an adhesive material. The adhesive material in the binding material can comprise one or more monomers, one or more polymers, or combinations thereof. The binding material comprising an adhesive material can be a liquid or a flowable gel. The adhesive material can be present in the binding material as a dispersion. Alternatively, the adhesive material is present in the binding material as an emulsion. The binding material comprising an adhesive material is provided through a printing head, such as an ink-jet print head. Thus, the binding material comprising an adhesive material has a viscosity that allows for dispersion through a print head. The adhesive material can be present in the binding material is provided via spraying using a spray head have one or more orifices of suitable diameter. In such instances, the binding material can comprise an adhesive material has a viscosity that allows for application via a spray head.

Now having described the annealing of the additive manufacturing powder and the composition of the annealed additive manufacturing powder, details regarding use of the annealed additive manufacturing powder in structures such as an article of footwear (e.g., a sole component in footwear), a component of footwear, an article of apparel, a component of apparel, an article of sporting equipment, or a component of sporting equipment will be provided. The structure can include and/or be made from annealed additive manufacturing powder (e.g., annealed additive manufacturing powder particles). The structure can be the product of an additive manufacturing process, where the annealed additive manufacturing powder can be used to form one or more layers in the additive manufacturing process to form the structure.

In general, the additive manufacturing device, also known as a three dimensional printer, can include a device body having a moveable tray for to form the product, at least one printhead or similar device for transferring the additive manufacturing powder, printhead maneuverability assembly, and a lid or cover. The annealed additive manufacturing powder can be disposed using the printhead or other similar device, where the annealed additive manufacturing powder can be stored in a compartment. The additive manufacturing device can include electronics and/or a computer to control the additive manufacturing device. The additive manufacturing device may also include a device for providing energy to affix the annealed additive manufacturing powder, where the device can include a directed energy device, a UV light producing mechanism, a microwave devices, or the like. The additive manufacturing device can include an oven to anneal the unannealed additive manufacturing powder.

The method of making an article can include applying, during an additive manufacturing process, a first layer of the annealed additive manufacturing powder in a build compartment of the additive manufacturing device. The first layer can vary in thickness from nanometers to millimeters to 10s of centimeters, or more depending upon the application. The first layer can include a plurality of annealed additive manufacturing powder particles, such as those described herein.

The method also includes affixing a portion of the plurality of the annealed additive manufacturing powder particles to each other in the first layer. Optionally, one or more layers can be disposed on the first layer to form the additive manufactured article. Affixing can include melting and then re-solidifying the plurality of the annealed additive manufacturing powder particles. In a particular, the melting and then re-solidifying includes re-flowing a portion of the annealed additive manufacturing powder particles in the first layer to form re-flowed annealed additive manufacturing powder particles and then re-solidifying the re-flowed annealed additive manufacturing powder particles, thereby affixing the annealed additive manufacturing powder particles to one another.

The method further comprises applying a second layer of the annealed additive manufacturing powder in a build compartment on the first layer. A portion of the plurality of the annealed additive manufacturing powder particles can be affixed to one another and/or the first layer. Affixing the second layer can include melting and then re-solidifying the plurality of the annealed additive manufacturing powder particles, which may include melting and then re-solidifying a portion of the first layer. In this way, the article formed can be monolithic and not include discrete layers.

Annealing can include annealing the additive manufacturing powder in an oven to form the annealed additive manufacturing powder. The oven can be part of the additive manufacturing device or separate from the additive manufacturing device.

Annealing can include heating the additive manufacturing powder in a second compartment (e.g., oven) of the additive manufacturing device to form the annealed additive manufacturing powder prior to applying the first layer of the annealed additive manufacturing powder in the build compartment of the additive manufacturing device.

As stated above, the annealed additive manufacturing powder can include a binder material and/or the binder material can be added to the annealed additive manufacturing powder after annealing. The binder material can include an energy absorber. In this regard, the affixing can include directing an energy (e.g., energy beam (e.g., laser), microwave energy, dispersed light (e.g., from a LED or bulb), or the like onto an area of the first layer. The energy absorber can convert the energy into thermal energy to reflow the annealed additive manufacturing powder.

The energy can be a directed energy beam such as a laser beam. The laser beam can be emitted by a gas dynamic laser, a diode laser, or a lead salt laser. The laser beam is emitted by a carbon dioxide laser. The laser beam can be within the infrared spectrum. The laser beam can broadly comprise the all or most of the infrared spectrum, or alternatively, the laser beam can comprise sub-regions of the infrared spectrum such as the far infrared spectrum, the near infrared spectrum, the mid infrared spectrum.

The laser beam can comprise a two or more laser beams, where each laser beam is directed at the target area. In addition, each of the two or more laser beams can comprise a different portion of the electromagnetic light spectrum. For example, the laser beam can comprise one laser emitting in the near infrared spectrum and a second laser beam emitting in the far infrared spectrum.

The laser beam can emit a beam with a wavelength of about 700 nm to about 1 mm; about 1 micrometer to about 20 micrometer; about 3 micrometer to about 15 micrometer; about 3 micrometer to about 8 micrometer; about 8 micrometer to about 15 micrometer; or about 9 micrometer to about 11 micrometer. The laser beam can have a beam width of about 0.1 millimeter to about 0.7 millimeter; about 0.2 millimeter to about 0.6 millimeter; about 0.3 millimeter to about 0.5 millimeter; or about 0.3 millimeter to about 0.4 millimeter. The laser beam can be de-focused.

The laser beam can have a scan pattern such that each pass of the laser beam overlaps the adjacent pass of the laser beam by a fractional amount of about 0.1 to 0.5. The laser beam can have a scan pattern such that each pass of the laser beam overlaps the adjacent pass of the laser beam by a fractional amount of about 0.3.

The directed energy beam can have a power output of about 25 to about 75 watts; about 35 to about 55 watts; about 45 to about 65 watts; or about 50 to about 60 watts. The directed energy beam can have a power output of about 55 watts.

The processing conditions comprise directing a directed energy beam at a scanning rate across a target area of about 7,500 millimeter/second to about 25,000 millimeter/second, or alternatively, at a scanning rate across a target area of about 10,000 mm/sec to about 15,000 millimeter/second. The processing conditions can comprise directing a directed energy beam at a scanning rate across a target area of about 12,500 millimeter/second.

Example

Figure 2:
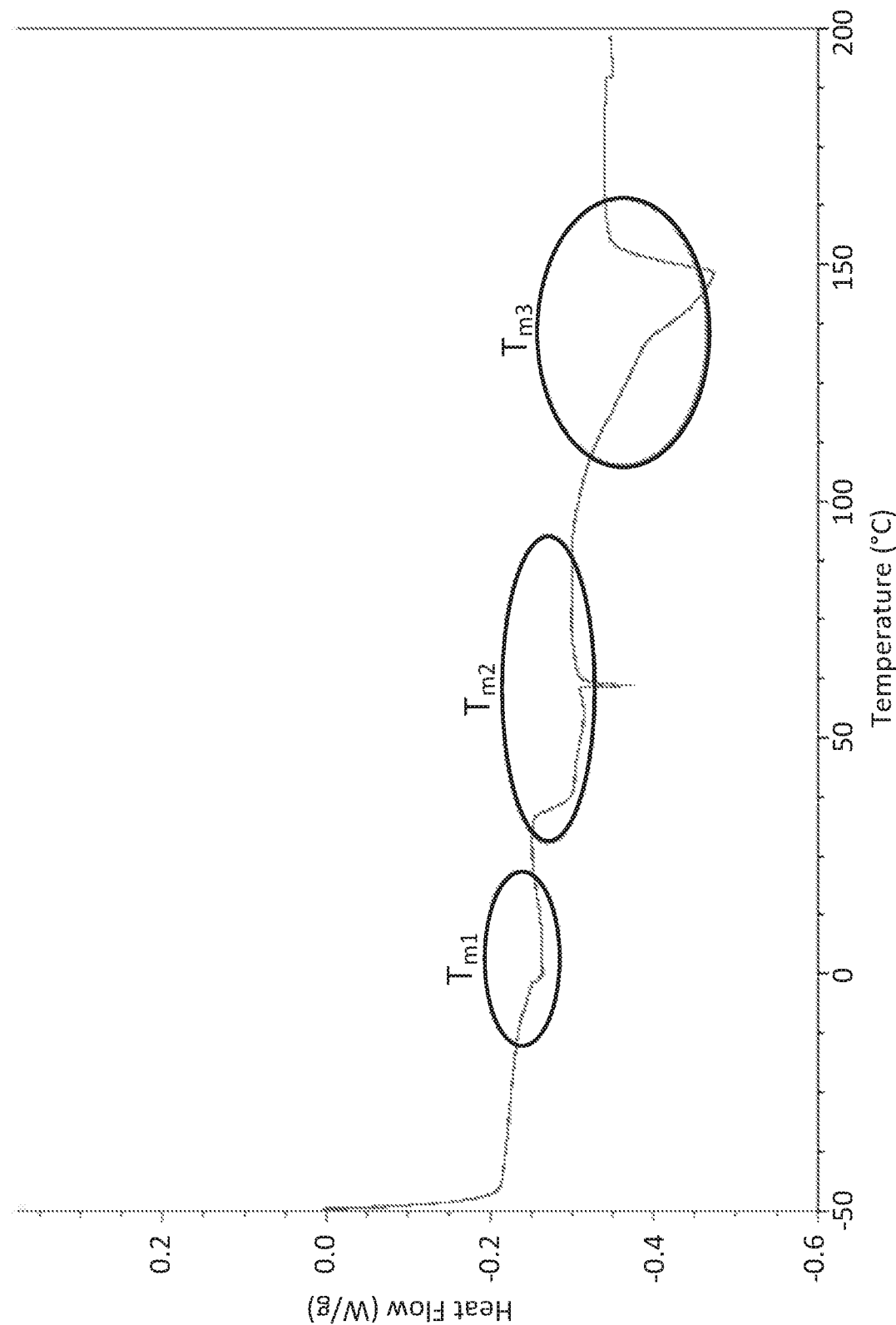
FIG. 2 illustrates a differential scanning calorimetry (DSC) plot for an unannealed additive manufacturing powder comprising a thermoplastic elastomer.

FIG. 2 illustrates a differential scanning calorimetry (DSC) plot for unannealed thermoplastic elastomer additive manufacturing powder BRSX72 obtained from Lehmann & Voss & Co. (Hamburg, Germany). The DSC shows that the unannealed powder exhibits three distinct melting peaks, each centered around a different melting temperature ($T_{m1}$, $T_{m2}$ and $T_{m3}$). The primary melting temperature ($T_{m3}$) is above 120 degrees Celsius, and the secondary melting temperature ($T_{m2}$) is between 25 degrees Celsius and 100 degrees Celsius.

Figure 3:
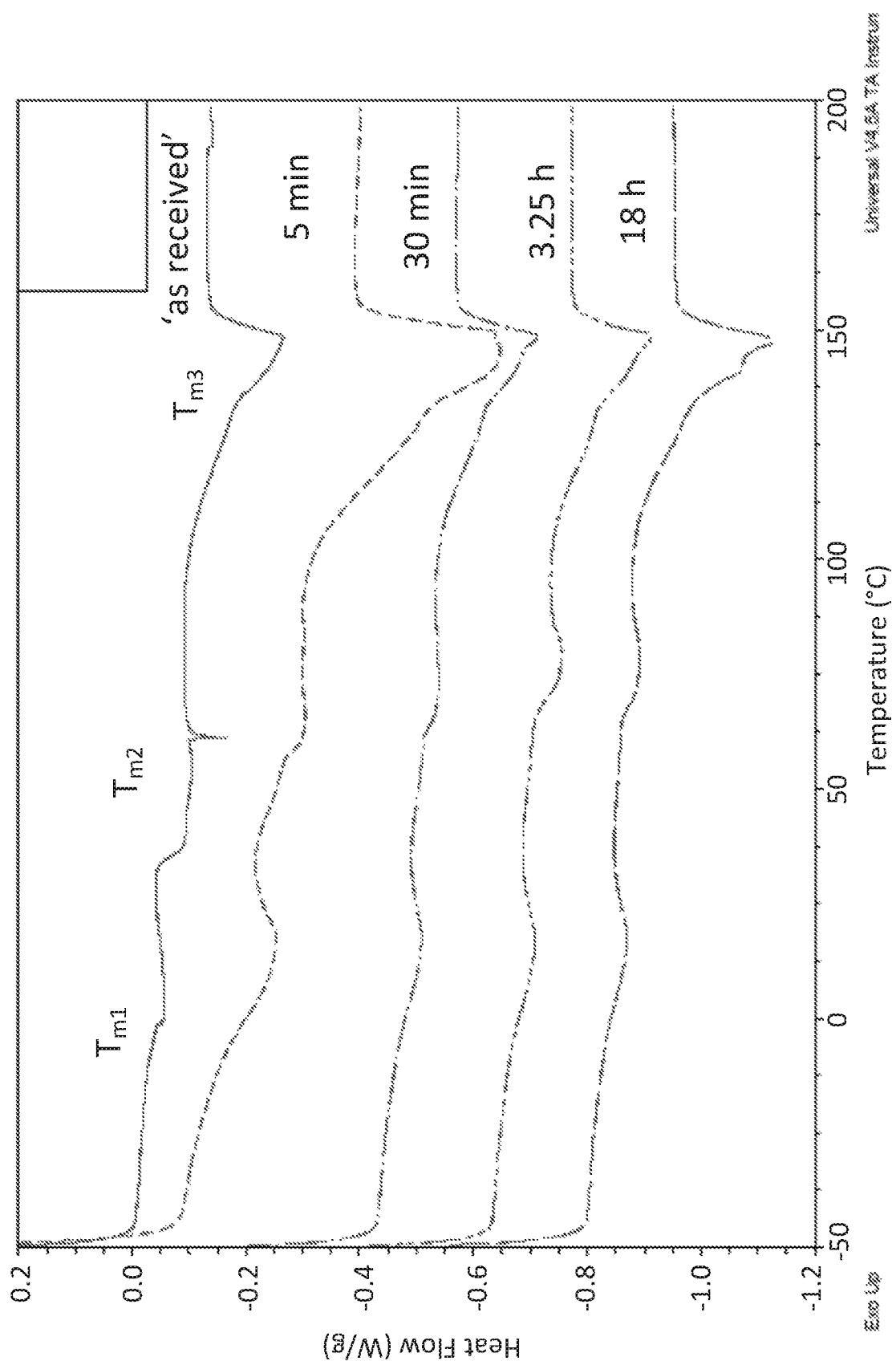
FIG. 3 is a DSC plot of the unannealed additive manufacturing powder and the same powder after annealing at 60 degrees Celsius for various amounts of time.

FIG. 3 is a DSC plot for a series of BRSX72 powders which have different thermal histories based on the length of time they have been annealed at 60 degrees Celsius. The "as received" sample is unannealed powder, the "5 min" sample is powder which was annealed at 60 degrees Celsius for a period of 5 minutes, the "30 min" sample is powder which was annealed at 60 degrees Celsius for 30 minutes, the "3.5 h" sample is power which was annealed at 60 degrees Celsius for 3.5 hours, and the "18 h" sample is powder which was annealed at 60 degrees C. for 18 hours. These plots illustrate that annealing the powder at 60° C. shifts the secondary melting temperature $T_{m2}$ to greater than 60° C. as a function of the duration of the annealing time. These plots also illustrate that annealing the power at 60 degrees Celsius does not alter the primary melting temperature of the powder ($T_{m3}$) substantially.

Figure 4:
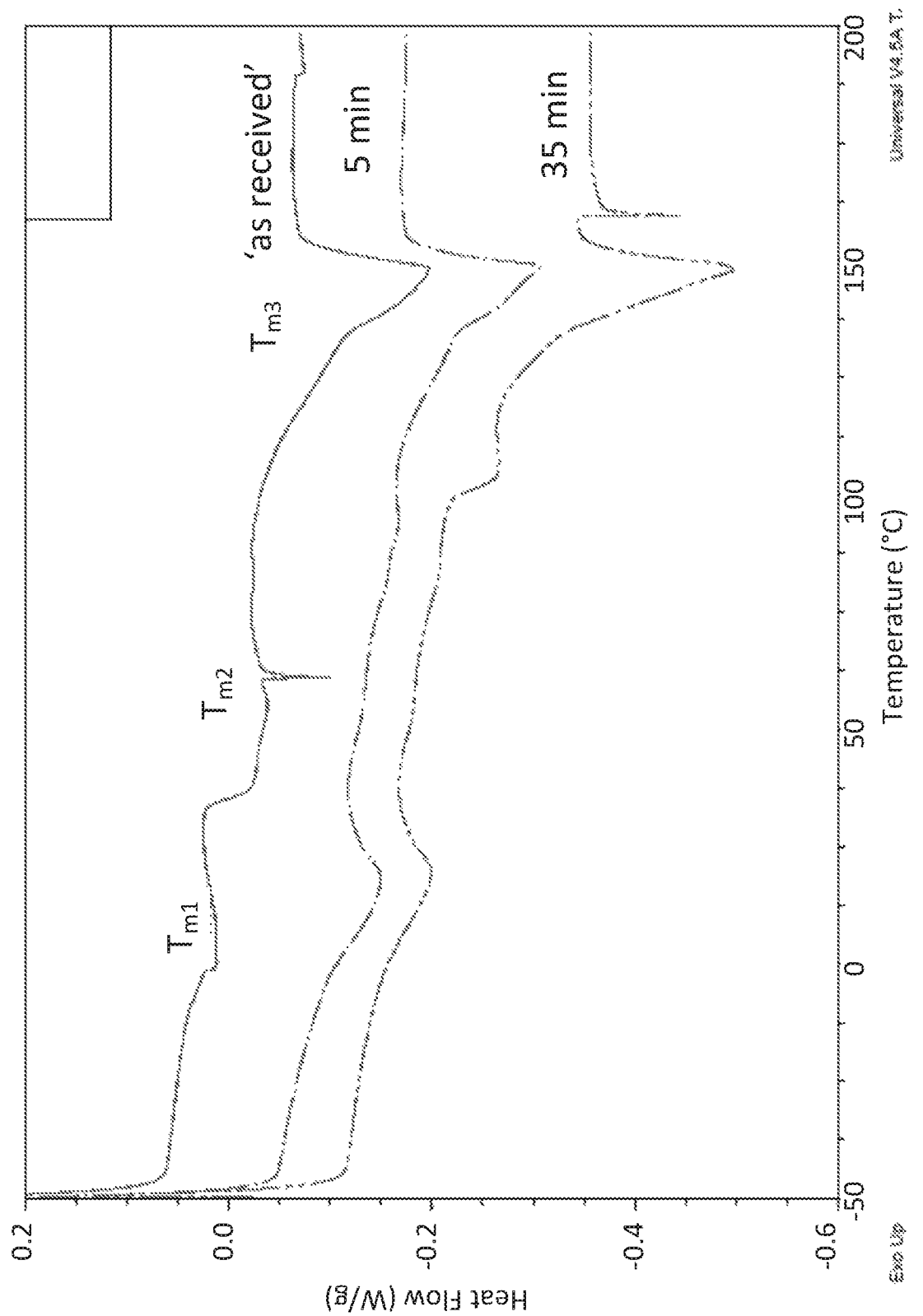
FIG. 4 is a DSC plot of the unannealed additive manufacturing powder and the same powder after annealing at 100 degrees Celsius for various amounts of time.

FIG. 4 is a DSC plot for a series of BRSX72 powders which have different thermal histories based on the length of time they have been annealed at 100 degrees Celsius. The "as received" sample is unannealed powder, the "5 min" sample is powder which was annealed at 100 degrees Celsius for a period of 5 minutes, and the "35 min" sample is powder which was annealed at 100 degrees Celsius for 35 minutes. In the "5 min" sample, the secondary melting temperature of the powder ($T_{m2}$) is much less prominent than in the unannealed sample, and has been shifted to a temperature nearer to the primary melting temperature of the powder ($T_{m3}$). In the "35 min" sample, the secondary melting temperature of the powder ($T_{m2}$) is also less prominent than in the unannealed sample, and also has been shifted to a temperature nearer to the primary melting temperature of the powder ($T_{m3}$).

Figure 5:
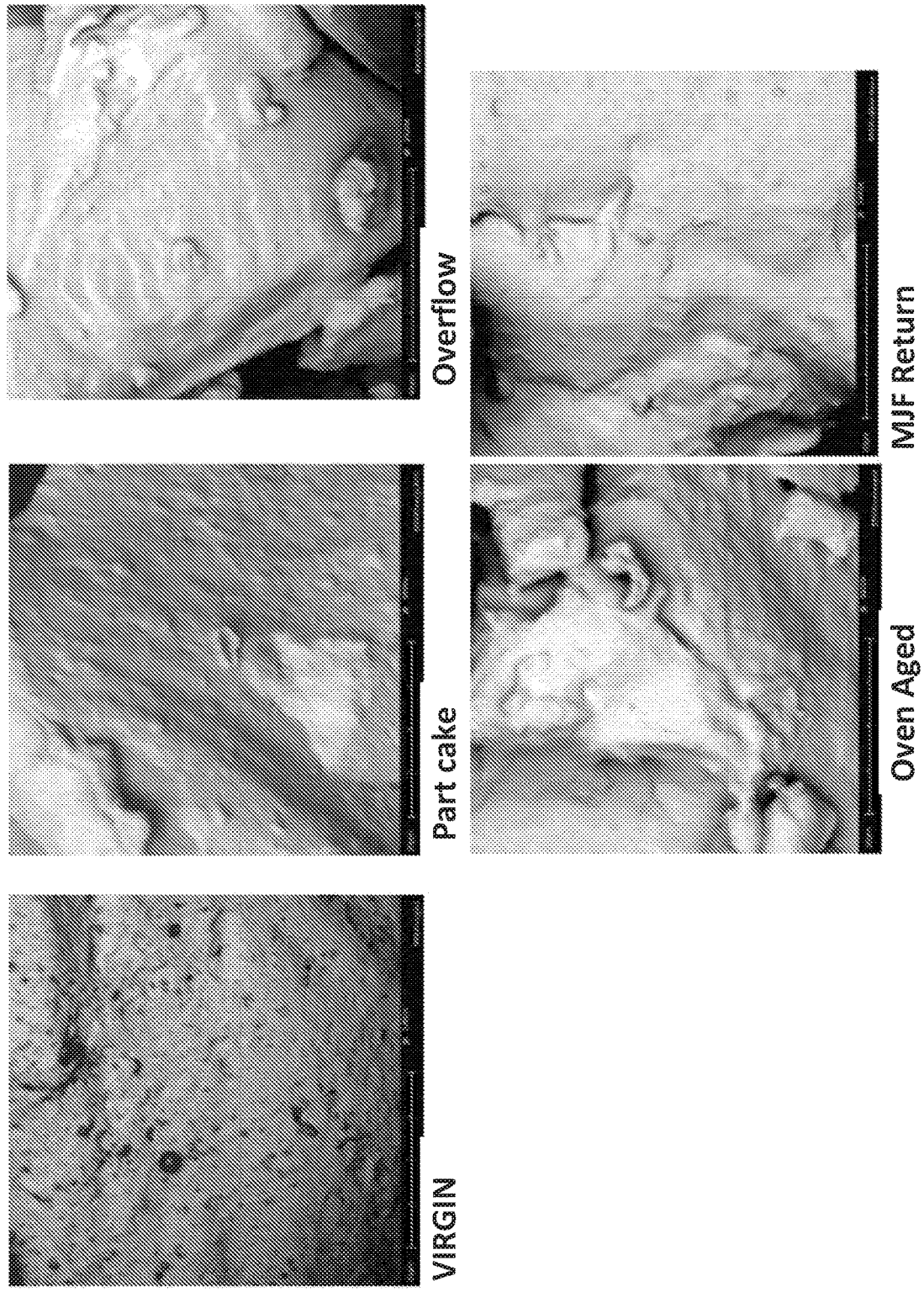
FIG. 5 shows a series of photomicrographs of a sample of the unannealed additive manufacturing powder, of samples of the additive manufacturing powder removed from different areas of the additive manufacturing device after running a single build cycle, and after annealing the powder in an oven.

FIG. 5 is a series of photomicrographs of individual particles in an unannealed sample of the BRSX72 powder (labeled "VIRGIN"), a sample of the BRSX72 powder annealed in at 100 degrees Celsius for 18 hours (labeled "Oven Aged"), and of samples of the BRSX72 powder removed from different locations of the additive manufacturing device after running a single build cycle. The "Part Cake" photomicrograph is a powder particle from a powder sample removed from the part cake in the build area of the device. The "Overflow" photomicrograph is a powder particle from a powder sample removed from the powder overflow area of the device. The "MJF Return" photomicrograph is a powder particle from a powder sample removed from the return compartment of the device.

The present disclosure is can be further described in the following clauses:

Clause 1. A method of forming an annealed additive manufacturing powder, comprising:
annealing an additive manufacturing powder, wherein annealing includes:
increasing a temperature of the additive manufacturing powder, wherein the additive manufacturing power comprises a thermoplastic elastomer (TPE), wherein the temperature is increased to a temperature above the glass transition temperature of the additive manufacturing powder but below a melting temperature of the additive manufacturing powder for a first period of time; and
decreasing the temperature of the powder by at least 10 degrees Celsius after the first period of time to form the annealed additive manufacturing powder.

Clause 2. The method of clause 1, wherein increasing includes increasing the temperature of the additive manufacturing powder to at least 60 degrees Celsius and wherein the first time period is at least 5 minutes.

Clause 3. The method of clause 1, wherein increasing includes increasing the temperature of the additive manufacturing powder to at least 100 degrees Celsius and wherein the first time period is at least 5 minutes.

Clause 4. The method of clauses 1-3, wherein the unannealed additive manufacturing powder has a glass transition temperature and at least a primary melting temperature and a secondary melting temperature as determined by differential scanning calorimetry (DSC), wherein the primary melting temperature is at a higher temperature than the secondary melting temperature.

Clause 5. The method of clause 4, wherein the glass transition temperature of the unannealed additive manufacturing powder is below 0 degrees Celsius, wherein the primary melting temperature of the unannealed additive manufacturing powder is above 120 degrees Celsius, wherein the unannealed additive manufacturing powder has a secondary melting temperature between the glass transition temperature and the primary melting temperature, wherein the secondary melting temperature of the unannealed additive manufacturing powder is about 30 degrees Celsius to about 100 degrees Celsius; and
wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is at least 30° higher than the secondary melting temperature of the unannealed additive manufacturing powder.

Clause 6. The method of clause 4, wherein:
the glass transition temperature of the unannealed additive manufacturing powder is below 0 degrees Celsius, wherein the primary melting temperature of the unannealed TPE material is above 120 degrees Celsius, wherein the unannealed additive manufacturing powder has a secondary melting temperature between the glass transition temperature and the primary melting temperature, wherein the secondary melting temperature of the additive manufacturing powder is about 30 degrees Celsius to about 100 degrees Celsius; and wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is about 80 degrees Celsius to about 120 degrees Celsius.

Clause 7. The method of clause 4, wherein:

the glass transition temperature of the unannealed additive manufacturing powder is below 0 degrees Celsius, wherein the primary melting temperature of the unannealed additive manufacturing powder is above 120 degrees Celsius, wherein the unannealed additive manufacturing powder has a secondary melting temperature between the glass transition temperature and the primary melting temperature, wherein the secondary melting temperature of the additive manufacturing powder is about 30 degrees Celsius to about 100 degrees Celsius; and wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is no longer detectable by differential scanning calorimetry (DSC).

Clause 8. The method of clauses 1 to 7, wherein the TPE comprises at least one thermoplastic polyurethane (TPU) elastomer.

Clause 9. The method of clause 7, wherein the TPE comprises a resin component that consists essentially of one or more TPU elastomers.

Clause 10. The method of clauses 8 or 9, wherein the TPU elastomer is a block copolymer including alkoxy blocks and diisocyanate blocks, wherein the alkoxy blocks include a plurality of alkoxy segments and the diisocyanate blocks include a plurality of diisocyanate segments, wherein the plurality of diisocyanate segments in the diisocyanate blocks are linked to each other by chain extending segments.

Clause 11. The method of clauses 9 or 10, wherein the TPU elastomer is a reaction polymer of a diisocyanate with a polyol.

Clause 12. The method of clause 10, wherein the diisocyanate segments of the diisocyanate blocks comprise an aliphatic diisocyanate segment, an aromatic diisocyanate segment, or both.

Clause 13. The method of clause 10, wherein the diisocyanate segments of the diisocyanate blocks comprise aliphatic diisocyanate segments.

Clause 14. The method of clause 13, wherein a majority of the diisocyanate segments of a majority of the diisocyanate blocks comprise the aliphatic diisocyanate segments.

Clause 15. The method of clause 14, wherein at least 90 percent of the diisocyanate segments of the majority of the diisocyanate blocks are aliphatic diisocyanate segments.

Clause 16. The method of clause 12, wherein the diisocyanate segments of the majority of the diisocyanate blocks consist essentially of aliphatic diisocyanate segments.

Clause 17. The method of clause 13, wherein the aliphatic diisocyanate segments are substantially linear aliphatic diisocyanate segments.

Clause 18. The method of clause 13, wherein at least 80 percent of the aliphatic diisocyanate segments are aliphatic diisocyanate segments that are free of side chains.

Clause 19. The method of clause 13, wherein the aliphatic diisocyanate segments include $C_2$-$C_{10}$ linear aliphatic diisocyanate segments.

Clause 20. The method of clause 13, wherein the aliphatic diisocyanate segments include hexamethylene diisocyanate (HDI) segments.

Clause 21. The method of clause 13, wherein a majority of the diisocyanate segments of the majority of the diisocyanate blocks are HDI segments.

Clause 22. The method of clause 13, wherein at least 90 percent of the diisocyanate segments within the majority of the diisocyanate blocks are HDI segments.

Clause 23. The method of clause 13, wherein the aliphatic diisocyanate segments include isophorone diisocyanate (IPDI) segments.

Clause 24. The method of clause 13, wherein at least 90 percent of the diisocyanate segments are IPDI segments.

Clause 25. The method of clause 13, wherein the diisocyanate segments includes aromatic diisocyanate segments.

Clause 26. The method of clause 13, wherein the aromatic diisocyanate segments include diphenylmethane diisocyanate (MDI) segments.

Clause 27. The method of clause 13, wherein the aromatic diisocyanate segments include toluene diisocyanate (TDI) segments.

Clause 28. The method of clause 11, wherein the alkoxy blocks include ester segments and ether segments.

Clause 29. The method of clause 11, wherein the alkoxy blocks include ester segments.

Clause 30. The method of clause 11, wherein the alkoxy blocks include ether segments Clause 31. The method of clauses 1 to 30, wherein the unannealed additive manufacturing powder further comprises a flow agent.

Clause 32. The method of clause 31, wherein the unannealed additive manufacturing powder comprises less than 1 weight percent of the flow agent.

Clause 33. The method of clause 31, wherein the unannealed additive manufacturing powder comprises about 0.1-0.5 weight percent of the flow agent.

Clause 34. The method of clause 31, wherein the flow agent has a maximum diameter of about 1 micrometer or less.

Clause 35. The method of clauses 1 to 34, wherein the unannealed additive manufacturing powder has a first powder bulk density and the annealed additive manufacturing powder has a second powder bulk density, wherein the second powder bulk density is less than the first powder bulk density; and wherein the unannealed additive manufacturing powder has a first particle bulk density and the annealed additive manufacturing powder has a second particle bulk density, wherein the first particle bulk density is less than the second particle bulk density.

Clause 36. The method of clauses 1-35, wherein the unannealed additive manufacturing powder as a first Hausner ratio as determined according to the ASTM D7481 standard (2009), wherein the annealed additive manufacturing powder as a second Hausner ratio as determined according to the ASTM D7481 standard (2009), wherein the second Hausner ratio is 5 percent lower than the first Hausner ratio.

Clause 37. The method of clauses 1 to 36, wherein the unannealed additive manufacturing powder as a first avalanche angle as determined by the Revolution Powder Analyzer (RPA) according to the ASTM D7481 standard (2009), wherein the annealed additive manufacturing powder has a second avalanche angle as determined by the Revolution Powder Analyzer (RPA) according to the ASTM D7481 standard (2009), wherein the second avalanche angle is 5 percent lower than the first avalanche angle.

Clause 38. The method of clauses 1 to 37, wherein the annealed additive manufacturing powder comprises a plurality of annealed additive manufacturing powder particles.

Clause 39. A structure, comprising an article which is the product of an additive manufacturing process including melting and re-solidifying a plurality of layers, each layer including plurality of annealed additive manufacturing powder particles of clause 38.

Clause 40. The structure of clause 39, wherein the article is an article of footwear, a component of footwear, an article of apparel, a component of apparel, an article of sporting equipment, or a component of sporting equipment.

Clause 41. The structure of clause 39, wherein the article is an article of footwear.

Clause 42. The structure of clause 39, wherein the article is a sole component for an article of footwear.

Clause 43. A method of making an article, comprising:
applying, during an additive manufacturing process, a first layer of an annealed additive manufacturing powder in a build compartment of an additive manufacturing device, wherein the annealed additive manufacturing powder comprises a plurality of annealed additive manufacturing powder particles of clause 38, wherein the annealed additive manufacturing powder comprises a thermoplastic elastomer (TPE);
affixing a portion of the plurality of the annealed additive manufacturing powder particles to each other in the first layer; and
forming an additive manufactured article.

Clause 44. The method of clause 43, wherein the affixing comprises melting and then re-solidifying the plurality of the annealed additive manufacturing powder particles.

Clause 45. The method of clauses 43 to 44, wherein affixing includes:
re-flowing a portion of the annealed additive manufacturing powder particles in the first layer to form re-flowed annealed additive manufacturing powder particles; and
re-solidifying the re-flowed annealed additive manufacturing powder particles, thereby affixing the annealed additive manufacturing powder particles to one another.

Clause 46. The method of clauses 43 to 45, further comprising:
applying a second layer of annealed additive manufacturing powder in a build compartment on the first layer, wherein the annealed additive manufacturing powder comprises the annealed additive manufacturing powder of clause 38; and
affixing a portion of the annealed additive manufacturing powder particles to each other in the second layer.

Clause 47. The method of clauses 43 to 46, further comprising annealing an unannealed additive manufacturing powder to form the annealed additive manufacturing powder.

Clause 48. The method of clause 47, wherein annealing comprises annealing the unannealed additive manufacturing powder in an oven to form the annealed additive manufacturing powder.

Clause 49. The method of clause 47, wherein annealing comprises heating the unannealed additive manufacturing powder in a second compartment of the additive manufacturing device to form the annealed additive manufacturing powder prior to applying the first layer of the annealed additive manufacturing powder in the build compartment of the additive manufacturing device.

Clause 50. The method of clauses 43 to 49, wherein the annealed additive manufacturing powder further comprises a binder material.

Clause 51. The method of clause 43 to 49, further comprising:
disposing a binder material comprising an energy absorber onto a portion of the annealed TPE material particles in the first layer prior to affixing the portion of the annealed additive manufacturing powder particles to each other.

Clause 52. The method of clauses 47 to 49, wherein re-flowing comprises directing an energy beam onto an area of the first layer of the annealed TPE material particles.

Clause 53. A structure, comprising an article formed by the process of clauses 43 to 52.

Clause 54. The structure of clause 53, wherein the article is an article of footwear, a component of footwear, an article of apparel, a component of apparel, an article of sporting equipment, or a component of sporting equipment.

Clause 55. The structure of clause 53, wherein the article is an article of footwear.

Clause 56. The structure of clause 53, wherein the article is a sole component for an article of footwear.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 weight percent to about 5 weight percent but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term "about" can include traditional rounding according to significant figures of the numerical value. In addition, the phrase "about 'x' to 'y'" includes "about 'x' to about 'y'".

Many variations and modifications may be made to the above-described aspects. All such modifications and variations are intended to be included herein within the scope of this disclosure and protected by the following claims.

What is claimed:

1. A method of forming an annealed additive manufacturing powder, comprising:
annealing an unannealed additive manufacturing powder, wherein annealing includes:
increasing a temperature of the unannealed additive manufacturing powder, wherein the unannealed additive manufacturing power comprises a thermoplastic elastomer (TPE), wherein the temperature is increased to a temperature above the glass transition temperature of the unannealed additive manufacturing powder but below a melting temperature of the unannealed additive manufacturing powder for a first period of time; and decreasing the temperature of the unannealed additive manufacturing powder by at least 10 degrees Celsius after the first period of time to form the annealed additive manufacturing powder;

wherein the unannealed additive manufacturing powder has a glass transition temperature and at least a primary melting temperature and a secondary melting temperature as determined by differential scanning calorimetry (DSC), wherein the primary melting temperature is at a higher temperature than the secondary melting temperature;

wherein the glass transition temperature of the unannealed additive manufacturing powder is below 0 degrees Celsius, wherein the primary melting temperature of the unannealed additive manufacturing powder is above 120 degrees Celsius, wherein the unannealed additive manufacturing powder has a secondary melting temperature between the glass transition temperature and the primary melting temperature, wherein the secondary melting temperature of the unannealed additive manufacturing powder is about 30 degrees Celsius to about 100 degrees Celsius; and wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is at least 30° higher than the secondary melting temperature of the unannealed additive manufacturing powder.

2. The method of claim 1, wherein increasing includes increasing the temperature of the unannealed additive manufacturing powder to at least 60 degrees Celsius and wherein the first time period is at least 5 minutes.

3. The method of claim 1, wherein the TPE comprises at least one thermoplastic polyurethane (TPU) elastomer.

4. The method of claim 1, wherein the unannealed additive manufacturing powder has a first powder bulk density and the annealed additive manufacturing powder has a second powder bulk density, wherein the second powder bulk density is less than the first powder bulk density; and wherein the unannealed additive manufacturing powder has a first particle bulk density and the annealed additive manufacturing powder has a second particle bulk density, wherein the first particle bulk density is less than the second particle bulk density.

5. The method of claim 1, wherein the unannealed additive manufacturing powder has a first Hausner ratio as determined according to the ASTM $D_{74}81$ standard (2009), wherein the annealed additive manufacturing powder has a second Hausner ratio as determined according to the ASTM $D_{74}81$ standard (2009), wherein the second Hausner ratio is 5 percent lower than the first Hausner ratio.

6. The method of claim 1, wherein the unannealed additive manufacturing powder has a first avalanche angle as determined by the Revolution Powder Analyzer (RPA) according to the ASTM $D_{74}81$ standard (2009), wherein the annealed additive manufacturing powder has a second avalanche angle as determined by the Revolution Powder Analyzer (RPA) according to the ASTM $D_{74}81$ standard (2009), wherein the second avalanche angle is 5 percent lower than the first avalanche angle.

7. The method of claim 1, wherein the annealed additive manufacturing powder comprises a plurality of annealed additive manufacturing powder particles.

8. A structure, comprising an article which is the product of an additive manufacturing process including melting and re-solidifying a plurality of layers, each layer including plurality of annealed additive manufacturing powder particles of claim 7.

9. The structure of claim 8, wherein the article is an article of footwear, a component of footwear, an article of apparel, a component of apparel, an article of sporting equipment, or a component of sporting equipment.

10. The structure of claim 8, wherein the article is an article of footwear.

11. The structure of claim 8, wherein the article is a sole component for an article of footwear.

12. A method of making an article, comprising:

applying, during an additive manufacturing process, a first layer of an annealed additive manufacturing powder in a build compartment of an additive manufacturing device, wherein the annealed additive manufacturing powder comprises a plurality of annealed additive manufacturing powder particles of claim 7, wherein the annealed additive manufacturing powder comprises a thermoplastic elastomer (TPE);

affixing a portion of the plurality of the annealed additive manufacturing powder particles to each other in the first layer; and forming an additive manufactured article.

13. The method of claim 12, wherein affixing includes:

re-flowing a portion of the annealed additive manufacturing powder particles in the first layer to form re-flowed annealed additive manufacturing powder particles; and re-solidifying the re-flowed annealed additive manufacturing powder particles, thereby affixing the annealed additive manufacturing powder particles to one another.

14. The method of claim 13, further comprising:

applying a second layer of annealed additive manufacturing powder in a build compartment on the first layer, wherein the annealed additive manufacturing powder comprises the annealed additive manufacturing powder of claim 7; and affixing a portion of the annealed additive manufacturing powder particles to each other in the second layer.

15. The method of claim 12, further comprising annealing an unannealed additive manufacturing powder to form the annealed additive manufacturing powder.

16. The method of claim 15, wherein annealing comprises heating the unannealed additive manufacturing powder in a second compartment of the additive manufacturing device to form the annealed additive manufacturing powder prior to applying the first layer of the annealed additive manufacturing powder in the build compartment of the additive manufacturing device.

17. A method of forming an annealed additive manufacturing powder, comprising:

annealing an unannealed additive manufacturing powder, wherein annealing includes:

increasing a temperature of the unannealed additive manufacturing powder, wherein the unannealed additive manufacturing power comprises a thermoplastic elastomer (TPE), wherein the temperature is increased to a temperature above the glass transition temperature of the unannealed additive manufacturing powder but below a melting temperature of the unannealed additive manufacturing powder for a first period of time; and decreasing the temperature of the unannealed additive manufacturing powder by at least 10 degrees Celsius after the first period of time to form the annealed additive manufacturing powder;

wherein the unannealed additive manufacturing powder has a glass transition temperature and at least a primary melting temperature and a secondary melting temperature as determined by differential scanning calorimetry (DSC), wherein the primary melting temperature is at a higher temperature than the secondary melting temperature;

the glass transition temperature of the unannealed additive manufacturing powder is below 0 degrees Celsius, wherein the primary melting temperature of the unannealed TPE material is above 120 degrees Celsius, wherein the unannealed additive manufacturing powder has a secondary melting temperature between the glass transition temperature and the primary melting temperature, wherein the secondary melting temperature of the unannealed additive manufacturing powder is about 30 degrees Celsius to about 100 degrees Celsius; and wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is about 80 degrees Celsius to about 120 degrees Celsius.

18. The method of claim 17, wherein the TPE comprises at least one thermoplastic polyurethane (TPU) elastomer.

19. A method of forming an annealed additive manufacturing powder, comprising:

annealing an unannealed additive manufacturing powder, wherein annealing includes:

increasing a temperature of the unannealed additive manufacturing powder, wherein the unannealed additive manufacturing power comprises a thermoplastic elastomer (TPE), wherein the temperature is increased to a temperature above the glass transition temperature of the unannealed additive manufacturing powder but below a melting temperature of the unannealed additive manufacturing powder for a first period of time; and decreasing the temperature of the unannealed additive manufacturing powder by at least 10 degrees Celsius after the first period of time to form the annealed additive manufacturing powder;

wherein the unannealed additive manufacturing powder has a glass transition temperature and at least a primary melting temperature and a secondary melting temperature as determined by differential scanning calorimetry (DSC), wherein the primary melting temperature is at a higher temperature than the secondary melting temperature;

the glass transition temperature of the unannealed additive manufacturing powder is below 0 degrees Celsius, wherein the primary melting temperature of the unannealed additive manufacturing powder is above 120 degrees Celsius, wherein the unannealed additive manufacturing powder has a secondary melting temperature between the glass transition temperature and the primary melting temperature, wherein the secondary melting temperature of the unannealed additive manufacturing powder is about 30 degrees Celsius to about 100 degrees Celsius; and wherein the glass transition temperature of the annealed additive manufacturing powder is below 0 degrees Celsius and is within +/−5 degrees Celsius of the glass transition temperature of the unannealed additive manufacturing powder, wherein the primary melting temperature of the annealed additive manufacturing powder is above 120 degrees Celsius and is within +/−5 degrees Celsius of the primary melting temperature of the unannealed additive manufacturing powder, and wherein the secondary melting temperature of the annealed additive manufacturing powder is no longer detectable by differential scanning calorimetry (DSC).

20. The method of claim 19, wherein increasing includes increasing the temperature of the unannealed additive manufacturing powder to at least 60 degrees Celsius and wherein the first time period is at least 5 minutes.

* * * * *

UNITED STATES PATENT AND TRADEMARK OFFICE
CERTIFICATE OF CORRECTION

| | |
|---|---|
| PATENT NO. | : 11,597,142 B2 |
| APPLICATION NO. | : 16/970236 |
| DATED | : March 7, 2023 |
| INVENTOR(S) | : John Cross, Luis Folgar and Ryan R. Larson |

It is certified that error appears in the above-identified patent and that said Letters Patent is hereby corrected as shown below:

In the Claims

Claim 5, Column 37, Line 54 and Lines 56-57: "ASTM $D_7 81$" should read --ASTM D7481--.

Claim 6, Column 37, Lines 62 and 65: "ASTM $D_7 81$" should read --ASTM D7481--.

Signed and Sealed this
Sixteenth Day of May, 2023

Katherine Kelly Vidal
*Director of the United States Patent and Trademark Office*